Figure 1:
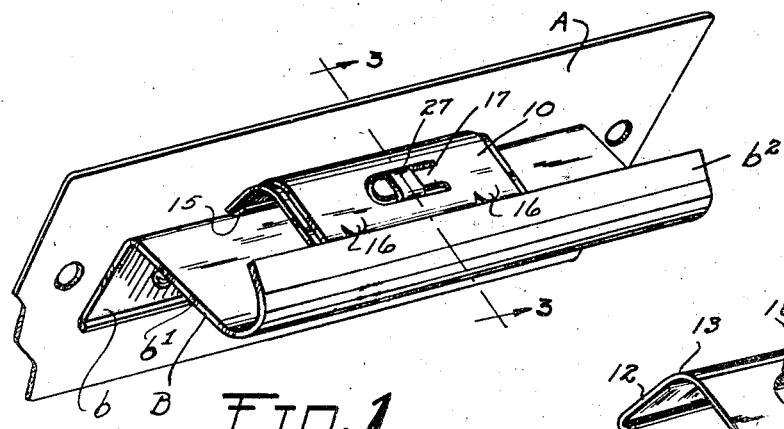

March 30, 1948. G. A. TINNERMAN 2,438,523
FASTENING DEVICE
Filed Aug. 21, 1944

INVENTOR.
George A. Tinnerman
BY Bates, Teare & McBean,
Attorneys

Patented Mar. 30, 1948

2,438,523

UNITED STATES PATENT OFFICE 2,438,523

FASTENING DEVICE

George A. Tinnerman, Cleveland, Ohio, assignor to Tinnerman Products, Inc., Cleveland, Ohio, a corporation of Ohio Application August 21, 1944, Serial No. 550,339

9 Claims. (Cl. 248—74)

This invention relates to a snap fastener adapted to be mounted by snap action in a trough-like support and thereby bind in place material in the support as, for instance, a group of insulated wires. In certain classes of manufacture, especially airplanes, it is customary to employ a structural brace in the form of a flanged member secured to a sheet projecting therefrom and curved backwardly at the free edge, such a brace being available for supporting a group of insulated wires employed in the machine. It is a specific object of this invention to provide a snap acting clip which may be mounted in such support and extend over a group of insulated wires therein and lock the same in the support.

It is a further object of this invention to provide such a snap locking clip with suitable insulating lining carried thereby to avoid any possible short-circuit or injury to the material clamped.

Another object of the invention is to provide a fastening clip which may not only retain members within a trough-shaped support but may act as a bridge member between different sections of the support for bracing the same.

The above-outlined objects and other features and advantages of the invention will become more clear from the following detailed description of a preferred embodiment thereof, as illustrated in the drawings.

Figure 2:
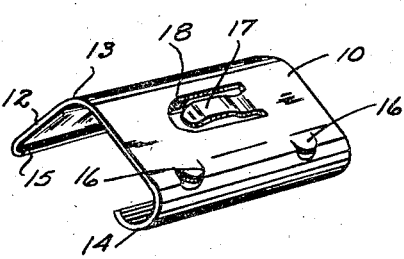
Figure 3:
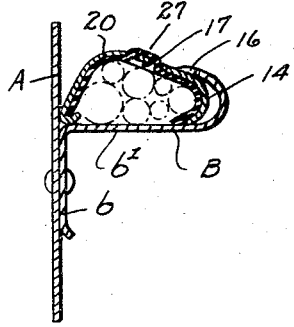
Figure 4:
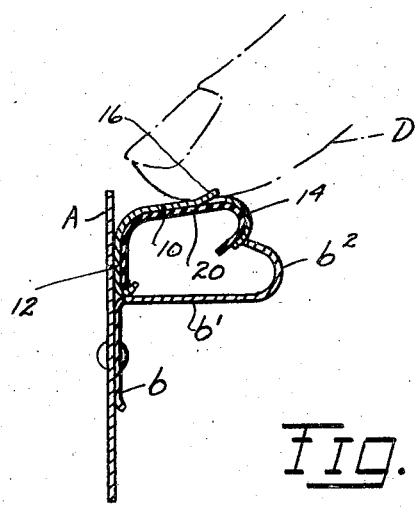
Figure 5:
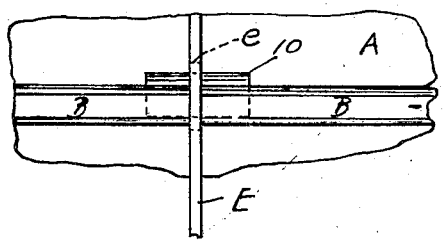
Figure 6:
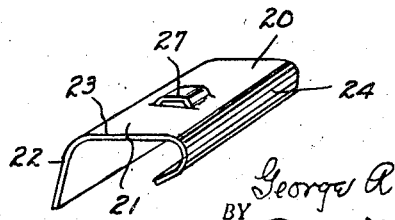

In the drawings, Fig. 1 is a perspective showing the trough-like support with my fastener mounted therein; Fig. 2 is a perspective of the fastener itself without the lining; Fig. 3 is a cross section through the support and fastener, showing the lined fastener in place clamping a group of insulated wires; Fig. 4 is a theoretic cross section illustrating the fastener in the act of being put into place; Fig. 5 is a fragmentary side elevation showing the fastener mounted as a bridge member extending across the junction of aligned structural braces; Fig. 6 is a perspective of the liner for the fastening clip.

As shown in Figs. 1, 2 and 3, A indicates a structural sheet which may be, for instance, part of an airplane wall or partition and B a longitudinal bracing member secured thereto. This bracing member usually has a flange $b$ riveted or otherwise secured to the sheet A; an intermediate portion $b'$ extending outwardly at right angles to the extreme portion $b$, and a portion $b^2$ leading from the intermediate portion $b'$ and forming a return bend, the free edge portion of which extends obliquely to the intermediate portion. It has been customary to utilize the trough-shaped space bounded by the plate A, the intermediate portion $b$ and the curved return portion $b^2$ of the strip as a support for carrying a group of insulating wires, as indicated by the broken circles in Fig. 3. My clip is adapted to be mounted by spring action in such trough-shaped support and embrace such group of wires, as will now be described.

As shown in the drawing, the fastening clip is a resilient sheet member bent into a form roughly approximating a letter C. This member, indicated by 10, has an intermediate substantially flat region, one edge of which is connected to a substantially flat projecting region 12 by a gradual curve 13, and the other edge of which merges into an approximately semi-cyclindrical curve 14. The arm 12 terminates by a return bend in a short inward flange indicated at 15.

Formed out of the intermediate portion of the clip near the return bend 14 are one or more upwardly extending lugs 16—two being shown in Figs. 1 and 2. These lugs are partially severed from the body of the clip back of the return bend and are thus integrally anchored thereto. They are bent up at an oblique angle to the plane of the intermediate portion, thus presenting abrupt ends.

My clip may be readily mounted by snap action in the trough-shaped support provided by the plate A and the structural reinforcing member B of Fig. 1 and thereafter retain itself in position therein to bind a group of wires or other members, as indicated in Fig. 3. In mounting the clip it may be placed in position over the articles to be bound with the flat rear portion 12 substantially against the face of the support and the return bend portion 14 resting on the edge of the return bend $b^2$ of the support as shown in Fig. 4. Then a downward manual pressure on the clip (indicated by the broken lines D in Fig. 4) will spring the return bend of the clip inwardly sufficiently to allow it to pass across the edge of the return bend $b^2$ into final position, as shown in Fig. 3. Or the return bent portion 14 may be placed first in the return bend $b^2$ of the support and the clip sprung into final position by downward pressure on the clip in the curved region 13.

When the clip is in position its lugs 16 engage the free edge of the return bend of the support and thus retain the clip with its rear edge engaging the supporting plate A and the member B, and with its front portion extending into the longitudinal recess provided by the return bend $b^2$ of the support. Accordingly, my clip may be readily mounted in such trough-like support in any location desired by merely manual pressure and when mounted automatically retains itself in place.

My clip, in addition to binding a group of wires or other material in the trough-shaped support, may be employed to constitute a bracing bridge member between aligned sections of the support. This is illustrated in Fig. 5, where A indicates a structural wall or other plate, and E indicates a partition extending at right angles to the wall A, and B—B designates two aligned structural bracing members secured to the wall on opposite sides of the partition. The partition has a hole e through it somewhat larger than the trough space of the members B and registering with such space. Accordingly, my clip 10 may be placed on either of the members B and shoved longitudinally through the hole e and then sprung into place by manual pressure so that it snugly engages each member B and forms a bridge between them, thus serving as a brace between the structural members.

It is desirable that the clip 10 be lined with insulating material, and to this end I provide a liner 20 of the general form shown in Fig. 6, which may be mounted within the recess of the clip. This liner is approximately of the same general shape as the clip, having an intermediate portion 21, one extreme portion 22 connected therewith by a gradual bend 23 and another extreme portion 24 in the form of a return bend. Such a liner may be mounted snugly within the recess of the clip with the edge of the extreme portion located within the longitudinal space provided by the short return bend 15, as clearly indicated in Figs. 3 and 4.

To prevent longitudinal displacement of the liner within the clip, I prefer to provide a tongue on the clip adapted to coact with a looped portion of the liner; that is to say, I provide the clip with a tongue 17 formed by a U-shaped slot 18 in the body of the clip and I provide the liner with an upwardly bowed loop 27 formed between a pair of parallel slits in the intermediate region of the liner. When the liner is in place on the clip the loop 27 projects upwardly into the slot 18 and the tongue 17 extends beneath the loop, as shown in Figs. 1 and 3.

The tongue 17 is intermediately upwardly bowed, as shown in Figs. 2, so that when the liner is mounted this upwardly bowed portion pulls the loop 27 well up into the slot providing the tongue, which results in a firm anchoring of the liner to the clip, also insures that the intermediate region of the tongue exposed beneath the loop 27 shall be well above any wire or other member embraced by the clip. Accordingly, there is no danger of the clip at any point short-circuiting the clamped wires if the insulation of the wire should be faulty.

It results from the above described construction that the liner may be very readily mounted in the clip by being first placed in longitudinal registration with it and then shifted endwise until the tongue passes beneath the loop of the liner, with the result that the liner extends snugly along the inner face of the clip with its loop extending over the tongue 17. The tongue, together with the flanged inner edge 15 of the clip, retains the liner effectively in position within the clip.

It will be seen that each member of my device, comprising the clip and liner, is of simple construction and the liner may be readily mounted within the clip ready for use, and the clip thereafter put into position wherever desired within the trough-shaped support to bind the articles therein.

I claim:

1. The combination of a wall, a longitudinal member secured thereto projecting outwardly therefrom and having a return bent free edge portion projecting toward the wall and a clip mounted between the wall and return bend and adapted to hold members in the support, said clip comprising a resilient member adapted to be sprung into position by snap action, said clip having an intermediate body portion and one extreme portion engaging the wall and another extreme portion providing a return bend from the body portion and extending beneath the free edge of the return bend of said longitudinal member.

2. The combination of a plate, a structural brace secured thereto having a flange secured to the face of the plate, an outwardly extending intermediate portion and an upwardly and inwardly curved edge portion, whereby the plate and structural brace provide a trough-shaped support in which a group of wires may be mounted, and a clip mounted in the trough-shaped support and embracing such wires, said clip having an intermediate portion, two extreme portions projecting therefrom, one extreme portion bearing against the plate and the structural member, the other extreme portion extending into the region provided by the return bend of the structural member, the intermediate portion of the clip carrying an upwardly projecting lug engaging the extreme free edge of the structural member.

3. The combination with a wall of a pair of aligned structural members secured to the wall and projecting outwardly therefrom and curved over by a return bend to provide with the wall a trough, a clip extending laterally across the trough and longitudinally across the end portions of both members forming a bridge therefor, said clip being formed with an intermediate portion and two extreme portions bent from the intermediate portion, one extreme portion coacting with the wall and the structural members and the other extreme portion coacting with the return bend of the structural members.

4. A fastening device comprising a strip of resilient sheet material having an intermediate region, two extreme regions bent therefrom toward the same side of the intermediate region, one of the extreme regions projecting farther than the other extreme region, the latter region being curved to constitute a return bend, and a projecting lug on the other side of the intermediate region back of the return bend.

5. A fastening device comprising a single strip of resilient sheet material formed with an intermediate substantially flat region, a substantially flat extreme region projecting downwardly at an angle to the intermediate region and joining it by gradual curve and another extreme region joining the opposite edge of the intermediate region and extending downwardly therefrom and being of approximately semi-cylindrical form, and a lug partially severed from the intermediate region adjacent the approximately semi-cylindrical curve and bent upwardly at an oblique angle to the intermediate region.

6. A fastening device comprising a strip of resilient sheet metal bent into an approximate C-shape having an intermediate flat portion, one extreme portion substantially flat but connected by a curve with the intermediate portion, the other extreme portion being curved inwardly by return bend, an insulated liner within the clip formed to fit the interior of the clip, a tongue partially severed from the intermediate region of the clip by a U-shaped slit therein, said liner having a looped portion partially severed from its intermediate region, the tongue of the clip extending beneath such looped portion of the liner.

7. A fastening device comprising a single strip of resilient sheet material having an intermediate portion and two integral extreme portions bent from the opposite edges of the intermediate portion and toward the same side of the intermediate portion, one of the extreme portions being curved inwardly by a return bend and the other extreme portion lying substantially in a plane nearly at a right angle to the intermediate portion and projecting away from the intermediate portion a greater distance than the other extreme portion.

8. A fastener comprising a clip of approximately C-shape, with a substantially flat intermediate portion and two extreme portions extending toward the same side of the intermediate portion, a tongue partially severed from the intermediate portion and anchored at its end to such portion, and a liner of substantially the same shape as the clip mounted within the recess of the clip, said liner having a looped portion partially severed from its intermediate region and projecting outwardly so that the tongue of the clip may extend through the loop of the liner.

9. A liner for a substantially C-shape fastener clip comprising a single strip of insulating material having a substantially rectangular intermediate portion and two extreme portions bent from the opposite edges of the intermediate portion toward the same side of said intermediate portion, one of the extreme portions being curved by a return bend, the other extreme portion being substantially straight and extending farther than the curved extreme portion, said intermediate portion having an integral strap extending crosswise of the intermediate portion and made by two spaced slits through said portion, said strip being raised from the intermediate region in the opposite direction from the extreme regions, and being free therefrom at opposite edges of the strap, whereby a tongue of the clip embracing the liner may be passed beneath the strap.

GEORGE A. TINNERMAN.

REFERENCES CITED

The following references are of record in the file of this patent:

UNITED STATES PATENTS

| Number | Name | Date |
|---|---|---|
| 470,698 | Murdock | Mar. 15, 1892 |
| 800,055 | Ayres | Sept 19, 1905 |
| 896,878 | Woodhouse | Aug. 25, 1908 |
| 1,028,829 | Reuterdahl | June 4, 1912 |
| 1,141,188 | Johnson | June 1, 1915 |
| 1,182,783 | Mitchell | May 9, 1916 |
| 1,277,550 | Connell | Sept. 3, 1918 |
| 1,668,953 | Erickson | May 8, 1928 |
| 2,141,222 | Ploch | Dec. 27, 1938 |
| 2,357,375 | Atkinson | Sept. 5, 1944 |
| 2,365,985 | West | Dec. 26, 1944 |